(12) United States Patent
Fujimine et al.

(10) Patent No.: US 8,183,168 B2
(45) Date of Patent: May 22, 2012

(54) PROCESS FOR PRODUCING ELECTRODE-FORMED GLASS SUBSTRATE

(75) Inventors: Satoshi Fujimine, Koriyama (JP); Hitoshi Onoda, Koriyama (JP); Kenji Imakita, Chiyoda-ku (JP); Yasuko Osaki, Chiyoda-ku (JP); Hiroyuki Yamamoto, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 963 days.

(21) Appl. No.: 12/138,062

(22) Filed: Jun. 12, 2008

(65) Prior Publication Data

US 2009/0017196 A1 Jan. 15, 2009

(30) Foreign Application Priority Data

Jul. 13, 2007 (JP) ................ 2007-184781
May 14, 2008 (JP) ................ 2008-127195

(51) Int. Cl.
*C03C 8/24* (2006.01)
*C03C 8/20* (2006.01)

(52) U.S. Cl. ............... 501/18; 501/15; 501/17; 501/26; 501/79; 427/126.2; 427/376.2; 427/383.5

(58) Field of Classification Search ............ 501/15, 501/17, 79, 18, 26; 427/126.2, 376.2, 383.5
See application file for complete search history.

(56) References Cited

U.S. PATENT DOCUMENTS

| | | | |
|---|---|---|---|
| 4,781,744 A | 11/1988 | Kobayashi et al. | |
| 5,236,495 A | 8/1993 | Manabe et al. | |
| 5,578,533 A | 11/1996 | Manabe et al. | |
| 5,618,764 A | 4/1997 | Usui et al. | |
| 5,643,636 A | 7/1997 | Usui et al. | |
| 5,858,897 A | 1/1999 | Maeda et al. | |
| 5,908,794 A | 6/1999 | Maeda et al. | |
| 5,948,537 A | 9/1999 | Onoda et al. | |
| 6,287,996 B1 | 9/2001 | Chiba et al. | |
| 6,376,400 B1 | 4/2002 | Fujimine et al. | |
| 6,497,962 B1 | 12/2002 | Fujimine et al. | |
| 6,617,789 B2 | 9/2003 | Onoda et al. | |
| 6,939,819 B2 | 9/2005 | Usui et al. | |
| 6,987,358 B2 | 1/2006 | Fujimine et al. | |
| 7,326,666 B2 | 2/2008 | Yamamoto et al. | |
| 2005/0231118 A1* | 10/2005 | Fujimine et al. | 313/586 |
| 2006/0052231 A1 | 3/2006 | Ito et al. | |
| 2006/0075782 A1 | 4/2006 | Watanabe et al. | |
| 2006/0119265 A1* | 6/2006 | Cho | 313/582 |
| 2006/0231737 A1 | 10/2006 | Matsumoto et al. | |
| 2006/0276322 A1* | 12/2006 | Hasegawa et al. | 501/49 |
| 2007/0032364 A1 | 2/2007 | Onoda et al. | |
| 2007/0236147 A1* | 10/2007 | Onoda | 313/586 |
| 2008/0081198 A1 | 4/2008 | Onoda et al. | |
| 2009/0004366 A1* | 1/2009 | Onoda et al. | 427/77 |

FOREIGN PATENT DOCUMENTS

| | | | |
|---|---|---|---|
| JP | 9-278482 | | 10/1997 |
| JP | 11-92168 | | 4/1999 |
| JP | 2000-313635 | | 11/2000 |
| JP | 2001163635 | * | 6/2001 |
| JP | 2005-314128 | | 11/2005 |
| JP | 2005-320227 | | 11/2005 |
| JP | 2006-221942 | | 8/2006 |
| JP | 2007-217271 | | 8/2007 |

OTHER PUBLICATIONS

Jonghee Hwang et al., "Effect of Residual Stress on Mechanical Properties of PDP Glass Substrate", P-54, SID International Symposium Digest, 2007, pp. 389-392.
U.S. Appl. No. 12/133,038, filed Jun. 4, 2008, Hitoshi Onoda et al.
U.S. Appl. No. 09/247,327, filed Feb. 10, 1999, Fujimine, et al.

* cited by examiner

*Primary Examiner* — Karl Group
(74) *Attorney, Agent, or Firm* — Oblon, Spivak, McClelland, Maier & Neustadt, L.L.P.

(57) ABSTRACT

A lead-free glass for covering electrodes including, as represented by mass % based on the following oxides, from 30 to 50% of $B_2O_3$, from 21 to 25% of $SiO_2$, from 10 to 35% of ZnO, from 7 to 14% in total of $K_2O$ and either one or both of $Li_2O$ and $Na_2O$, from 0 to 10% of $Al_2O_3$, and from 0 to 10% of $ZrO_2$, wherein when it contains at least one component selected from the group consisting of MgO, CaO, SrO and BaO, the total of their contents is at most 5%, and when the molar fractions of $Li_2O$, $Na_2O$ and $K_2O$ are represented by l, n and k, respectively, l is at most 0.025, and l+n+k is from 0.07 to 0.17.

18 Claims, 1 Drawing Sheet

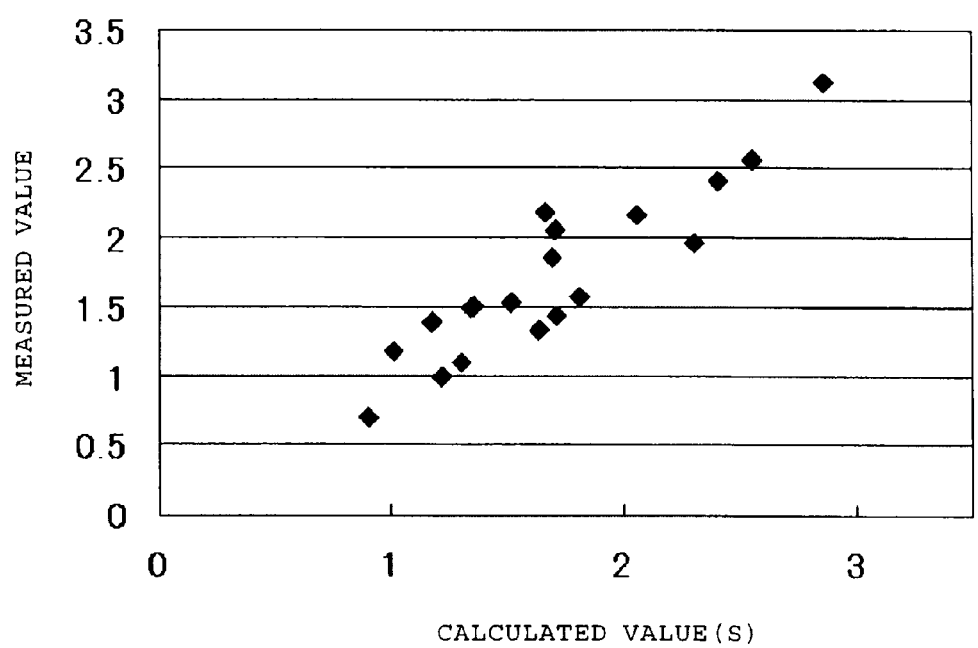

ing electrodes and an electrode-formed glass substrate, which are suitable for producing a front substrate of a plasma display device (PDP), and a process for producing an electrode-formed glass substrate.

PROCESS FOR PRODUCING ELECTRODE-FORMED GLASS SUBSTRATE

BACKGROUND OF THE INVENTION

1. Field of the Invention

The present invention relates to a lead-free glass for covering electrodes and an electrode-formed glass substrate, which are suitable for producing a front substrate of a plasma display device (PDP), and a process for producing an electrode-formed glass substrate.

2. Discussion of Background

PDP is a representative large-screen full-color display device.

PDP is produced in such a manner that a front substrate to be used as a display surface and a rear substrate having a plurality of stripe- or waffle-shaped barrier ribs formed thereon are sealed as faced with each other, and discharge gas is introduced between such substrates.

The front substrate is one in which a plurality of display electrode pairs for inducing surface discharge are formed on a front glass substrate, and the electrode pairs are covered by transparent glass dielectrics. Electrode pairs usually consist of transparent electrodes made of e.g. ITO, and bus electrodes to be formed on a part of the surface of the transparent electrodes. As the bus electrodes, silver electrodes or Cr—Cu—Cr electrodes are used.

On the rear substrate, barrier ribs and a fluorescent layer are formed in addition to the electrodes.

The glass (dielectrics) covering electrodes on the front substrate, is formed by e.g. a method of transferring a green sheet containing a glass powder onto the electrodes, followed by firing, or applying a paste containing a glass powder on electrodes, followed by firing.

The glass forming a dielectric layer on the front substrate is required to be fired at a low temperature, to have high transparency after firing, and to have no coloration by silver diffused from the silver electrodes. Further, along with the production of a large-sized plasma TV, lately, the weight of a glass substrate has been brought up as an issue, and it has been studied to use a thinner glass substrate. However, in such a case, there is a concern such that the strength of the substrate may decrease. Therefore, in order to increase the strength of a PDP front substrate, it has been proposed to reduce the expansion coefficient of an electrode-covering layer (Non-patent Document 1).

Further, other than such a problem that the strength of the front substrate may decrease, there is a problem such as warpage or breaking of the front substrate during firing the glass powder, and the following method is suggested to solve such a problem. That is, with respect to the linear expansion coefficients $\alpha_A$ and $\alpha_B$, of the glass substrate and the electrode-covering glass (electrode-covering layer), it is possible to prevent warpage or breaking of the front substrate by satisfying $(\alpha_A - 20 \times 10^{-7}/°C.) < \alpha_B < \alpha_A$ to bring the remaining stress of the glass substrate to be from −800 to +1,500 psi. Such an electrode-covering glass is particularly preferably one having a composition comprising, based on mass %, from 10 to 45% of $B_2O_3$, from 0.5 to 20% of $SiO_2$, from 20 to 55% of ZnO, from 3 to 20% of $K_2O$, from 0 to 10% of $Na_2O$, from 0 to 5% of $CuO+Bi_2O_3+Sb_2O_3+CeO_2+MnO$, and from 0 to 30% of $Nb_2O_3+La_2O_3+WO_3$ (Patent Document 1).

Patent Document 1: JP-A-2006-221942 (such as "0013", "0017", or "0022")

Non-Patent Document 1: 2007 SID INTERNATIONAL SYMPOSIUM DIGEST pp 389-392

SUMMARY OF THE INVENTION

When the compositions, as represented by mass %, of a commercially available electrode-covering glass of a PDP front substrate was analyzed, it was found to comprise 35.5% of $B_2O_3$, 11.5% of $SiO_2$, 40% of ZnO, 9% of $K_2O$, 1% of $Na_2O$, 2% of CaO, and 1% of $Al_2O_3$. Such a glass was an electrode-covering glass which was regarded as particularly preferred in the above Patent Document 1.

A glass having the same composition as such electrode-covering glass, was used to cover one side of the entire conventional PDP glass substrate (which is PD 200 manufactured by Asahi Glass Company, Limited, wherein $\alpha_A$ is $83 \times 10^{-7}/°$ C., and which will be hereinafter sometimes referred to as "a conventional glass substrate"), by firing at 570° C. and when the strength was measured, the falling ball strength $H/H_0$, which will be described later, was 1.3.

However, as mentioned above, the improvement of the strength of the PDP front substrate has continuously been demanded.

Such a demand may possibly be fulfilled if the method suggested in Non-patent Document 1, is used, but on the other hand, it raises another problem that the difference between the average linear expansion coefficient $\alpha$ and the above $\alpha_A$, of the electrode-covering glass at a temperature of from 50 to 350° C. becomes too large, whereby the front substrate may be deformed.

The present invention has an object to provide a glass for covering electrodes, a process for producing an electrode-formed glass substrate, an electrode-formed glass substrate wherein the electrodes on the glass substrate are covered with such a glass for covering electrodes and a glass ceramic composition for covering electrodes, which can increase the strength of a PDP front substrate without decreasing $\alpha$.

The present invention provides a lead-free glass for covering electrodes (the glass of the present invention) comprising, as represented by mass % based on the following oxides, from 30 to 50% of $B_2O_3$, from 21 to 25% of $SiO_2$, from 10 to 35% of ZnO, from 7 to 14% in total of $K_2O$ and either one or both of $Li_2O$ and $Na_2O$, from 0 to 10% of $Al_2O_3$, and from 0 to 10% of $ZrO_2$, wherein when it contains at least one component selected from the group consisting of MgO, CaO, SrO and BaO, the total of their contents is at most 5%, and when the molar fractions of $Li_2O$, $Na_2O$ and $K_2O$ are represented by l, n and k, respectively, l is at most 0.025, and l+n+k is from 0.07 to 0.17.

Further, the present invention provides the glass of the present invention wherein the lead-free glass (the glass 1 of the present invention) has a $B_2O_3$ content of at least 43%, a ZnO content of at most 23%, an $Li_2O$ content of from 0 to 0.5%, an $Na_2O$ content of from 2 to 5%, a $K_2O$ content of from 4 to 10%, a total content of $Li_2O$, $Na_2O$ and $K_2O$ of at most 12% and an $Al_2O_3$ content of from 0 to 5%, and l+n+k is at most 0.11.

Further, the present invention provides a glass ceramic composition for covering electrodes (the glass ceramic composition of the present invention) comprising, a powder of a lead-free glass and a powder of a titanium oxide, wherein the lead-free glass comprises, as represented by mass % based on the following oxides, from 30 to 50% of $B_2O_3$, from 21 to 25% of $SiO_2$, from 10 to 23% of ZnO, from 9 to 19% in total of $K_2O$ and either one or both of $Li_2O$ and $Na_2O$, from 0 to 10% of $Al_2O_3$, and from 0 to 5% of $ZrO_2$ and when the lead-free glass contains at least one component selected from the group consisting of MgO, CaO, SrO and BaO, the total of their contents is at most 5%, and when the molar fractions of $Li_2O$, $Na_2O$ and $K_2O$ are represented by l, n and k, respectively, l is at most 0.025, and l+n+k is from 0.08 to 0.17.

Further, the present invention provides a process for producing an electrode-formed glass substrate (the process for producing a glass substrate of the present invention) comprising forming electrodes on a glass substrate and covering the electrodes with glass, wherein the electrodes are covered by the glass of the present invention.

Further, the present invention provides a process for producing an electrode-formed glass substrate comprising forming electrodes on a glass substrate and covering the electrodes with glass, wherein the glass ceramic composition of the present invention, is fired to form glass to cover the electrodes. Moreover, such a process for producing an electrode-formed glass substrate, belongs to the process for producing a glass substrate of the present invention.

Further, the present invention provides PDP (PDP of the present invention) comprising a front glass substrate to be used as a display surface, a rear glass substrate and barrier ribs to define cells, wherein transparent electrodes on the front glass substrate or electrodes on the rear glass substrate are covered by the glass of the present invention.

In order to solve the above-mentioned problem, it is considered necessary to find factors which influence $H/H_0$ by measuring $H/H_0$. However, as will be described later, H is one obtained by measuring the falling ball strength of a glass specimen (a glass layer-coated glass substrate) made by coating a glass substrate with a glass paste, followed by firing, and one which tends to be influenced not only by the glass substrate or the glass for covering electrodes, but also by a vehicle constitution or a firing condition of the glass paste.

Now, in order to increase the accuracy in the measurement of such H, it became clear that the number of the measurements, n, needed to be at least 5. Consequently, it was difficult to employ the method of finding the factors which influence $H/H_0$, by measuring $H/H_0$, since a tremendous amount of work was required for improvement of accuracy in measuring H.

Therefore, the present inventors have conducted a research for a method which is capable of estimating $H/H_0$ without a measurement. As a result, they have found that the strength index S and the measured falling ball strength $H/H_0$, were well matched as shown in Drawing 1, wherein the strength index S was obtained by calculation by the following formula by inserting an elastic modulus E (unit: GPa), a fracture toughness value Kc (unit: $MPa \cdot m^{1/2}$) and α (unit: $10^{-7}/°C.$) of the electrode-covering glass, and α (unit: $10^{-7}/°C.$) of a glass substrate i.e. $α_0$. By carrying out the study by using such a method, namely, a method to estimate $H/H_0$ by using the strength index S, the present invention has been accomplished. Further, with respect to the calculation for S, when $α_0$ is, for example, $83 \times 10^{-7}/°C.$, $α_0$ in the following formula is represented by 83, and the same applies to E, Kc and α. Further, $H/H_0$ is approximately S±0.2.

$$S = [13.314 \times Kc + 0.181 \times (α_0 - α)]^2/E$$

BRIEF DESCRIPTION OF DRAWING

The FIGURE is a graph showing the relation between the calculated value and the measured value of the falling ball strength of a glass layer-coated glass substrate.

The FIGURE is obtained by using a conventional glass substrate as the glass substrate. The abscissa represents the above S, and the ordinate represents the above $H/H_0$. Further, the compositional ranges, as represented by mass %, of the electrode-covering glass used for preparing Drawing 1, are from 1.2 to 40.6% of $B_2O_3$, from 0.4% to 33.3% of $SiO_2$, from 0 to 39.6% of ZnO, from 0 to 4.4% of $Li_2O$, from 0 to 4.9% of $Na_2O$, from 0 to 11.2% of $K_2O$, from 0 to 14.9% of $Al_2O_3$, from 0 to 0.4% of MgO, from 0 to 14.6% of BaO, from 0 to 2.1% of $TiO_2$, from 0 to 54.3% of $Bi_2O_3$ and from 0 to 86.1% of PbO.

E, Kc and α are, respectively, values of physical properties of the electrode-covering glass itself, and they are not influenced by a vehicle constitution or a firing condition of the glass paste. Therefore, in such a method to estimate $H/H_0$, there is no such problem as mentioned above in measuring H.

Kc is measured, for example, as follows.

Molten glass is poured into a stainless steel frame and annealed.

The annealed glass is formed into a plate-form glass, and its one side is mirror-polished, followed by annealing (precise annealing) to remove the remaining stress, thereby to obtain a glass specimen having a typical size of 50 mm×50 mm and a thickness of 10 mm. Here, the precise annealing is carried out in such a manner that, when the glass transition point of the glass is represented by Tg, the glass is held at from Tg to (Tg+20° C.) for one hour and then cooled to room temperature at a temperature-lowering rate of 1° C./min.

By using such a glass specimen, Kc is measured in accordance with JIS R 1607-1995 "Testing methods for fracture toughness of fine ceramics 5. IF method" (indenter pressing method). That is, by using a Vickers hardness tester, inside a globe box having a relative humidity of 35%, a Vickers indenter is pressed against the surface of the glass specimen for 15 seconds, and the diagonal length of indentation and cracking length are measured by using a microscope attached to the tester. The Vickers hardness (Hv) is obtained from the pressing load and the diagonal length, and Kc is calculated from the cracking length, Hv, E and the pressing load. The pressing load is, for example, from 100 g to 2 kg.

α is measured, for example, as follows.

The annealed glass is formed into a cylindrical form having a length of 20 mm and a diameter of 5 mm, and the average linear expansion coefficient α from 50 to 350° C. is measured by using quarts glass as standard and a horizontal differential detection system thermal dilatometer TD 5010SA-N manufactured by Brucker AXS K.K.

E is measured, for example, as follows.

The annealed glass is formed into a plate-form having a thickness of 10 mm, and the elastic modulus E is measured by JIS R 1602-1995 "Testing methods for elastic modulus of fine ceramics 5.3 Ultrasonic pulse method".

$H/H_0$ is measured as follows.

Typically, a glass substrate having a size of 100 mm×100 mm and a thickness of 2.8 mm, is placed on a water-resistant polishing paper having a production particle size of #1500. From a height of 10 cm from the upper surface of the glass substrate, 22 g of a stainless steel ball is dropped. If the glass substrate does not break by the drop of the stainless steel ball, the dropping height is adjusted to be 10 mm higher, and the stainless steel ball is dropped again. Until the glass substrate breaks, the dropping height is adjusted to be higher by 10 mm each time, and the stainless steel ball is then dropped. Such a breaking test of glass substrate is carried out for five times, and an average value of the obtained breaking heights is represented by $H_0$.

H is an average value of breaking heights measured in the same manner as for $H_0$, with respect to a glass layer-coated glass substrate having one surface of the glass substrate covered with an electrode-covering glass.

That is, H is an average value of breaking heights obtained by carrying out the breaking test of the glass layer-coated glass substrate for five times in the same manner as $H_0$ measurement, except that the surface covered with an electrode-covering glass is faced down and put on the above water-resistant polishing paper.

The above glass layer-coated glass substrate is produced as follows.

100 g of a powder of the electrode-covering glass was kneaded with 25 g of an organic vehicle having 10 mass % of ethyl cellulose dissolved in α-terpineol or the like, to prepare a glass paste. The paste was uniformly screen-printed on a glass substrate having a size of 100 mm×100 mm, and dried at 120° C. for 10 minutes. Then, such a glass substrate was heated at a temperature-raising rate of 10° C. per minute up to a temperature in a range of from (Ts−50° C.) to Ts, where Ts is the softening point of the electrode-covering glass and maintained at that temperature for 30 minutes to carry out firing, whereby an electrode-covering glass layer was formed on the glass substrate, which is regarded as a glass layer-coated glass substrate.

According to the present invention, it is possible to increase the strength without decreasing α of the electrode-covering glass of the PDP front substrate.

Further, according to a preferred mode of the present invention, it is possible to obtain a glass for covering electrodes having a low dielectric constant, and for example, it is possible to reduce power consumption of PDP. Further, when such a glass is used for covering address electrodes of a PDP rear substrate, it is possible to suppress the increase of the dielectric constant while increasing reflectance by incorporating a titanium oxide powder having a high dielectric constant to the address electrode-covering glass.

DETAILED DESCRIPTION OF THE PREFERRED EMBODIMENTS

The present invention is suitable when α of the glass substrate i.e. $α_0$ is from $78×10^{-7}$ to $88×10^{-7}$/° C., particularly from $80×10^{-7}$ to $86×10^{-7}$/° C.

The glass of the present invention is usually ground and classified, and used in the form of a powder.

In a case where the electrodes are to be covered by a glass paste, the powdered glass of the present invention (hereinafter referred to as "the glass powder of the present invention") is kneaded with a vehicle to obtain a glass paste. The glass paste is applied on a glass substrate on which electrodes such as transparent electrodes are formed, and fired to form a glass layer for covering the transparent electrodes.

In a case where the electrodes are to be covered by a green sheet, the glass powder of the present invention is kneaded with a resin, and the kneaded product obtained is applied on a supporting film such as a polyethylene film to obtain a green sheet. This green sheet is transferred onto electrodes formed, for example, on a glass substrate, and fired to form a glass layer for covering the electrodes.

Now, in the production of a PDP front substrate, such firing is carried out typically at a temperature of at most 600° C. Further, the glass substrate having a glass layer formed in such a manner is the glass substrate of the present invention.

An average particle diameter ($D_{50}$) of the glass powder of the present invention is preferably at least 0.5 μm. If $D_{50}$ is less than 0.5 μm, it may take a too much time for such powderization. $D_{50}$ is more preferably at least 0.7 μm. Further, the above average particle diameter is preferably at most 4 μm, more preferably at most 3 μm.

The maximum particle diameter of the glass powder of the present invention is preferably at most 20 μm. If the maximum particle diameter exceeds 20 μm, the surface of the glass layer becomes so uneven as to distort an image on the PDP in the use for formation of an electrode-covering glass layer (transparent dielectric layer) of a PDP front substrate, wherein the thickness is required to be usually at most 30 μm. The maximum particle diameter is more preferably at most 10 μm.

Ts of the glass of the present invention is preferably at most 630° C. If it exceeds 630° C., it may be difficult to obtain a high transmittance glass layer by the firing at a temperature of at most 600° C. It is more preferably at most 620° C., typically at most 615° C. or 610° C.

Further, Ts is preferably at least 500° C. If Ts is lower than 500° C., a resin component contained in a glass paste or a green sheet may not be sufficiently decomposed in the firing step.

In a case where power consumption of PDP is to be lowered, the relative dielectric constant (∈) of the glass of the present invention at 1 MHz, is preferably at most 7.5, more preferably at most 7, particularly preferably at most 6.4.

Kc of the glass of the present invention is preferably at least 0.74 MPa·m$^{1/2}$, more preferably at least 0.76 MPa·m$^{1/2}$, particularly preferably at least 0.78 MPa·m$^{1/2}$. Kc is a value of a physical property relating to the strength of a glass material, and it is an important element to control the strength of an electrode-covering glass layer. Further, it is also an important element to control the strength of a glass substrate having such an electrode-covering glass layer formed on its surface, such as the glass substrate of the present invention or the front substrate of PDP of the present invention.

The breaking of the PDP front substrate is considered to happen in such a manner that when an impact is exerted on the PDP front substrate, and the substrate is deformed, an electrode-covering glass layer which is partially in contact with barrier ribs formed on the rear substrate, crashes to such ribs and becomes damaged. However, since Kc of the glass of the present invention is at least, for example, 0.74 MPa·m$^{1/2}$, it is considered that even if the electrode-covering glass layer becomes damaged like above, it is rare that the damage reaches breaking.

E of the glass of the present invention is from 55 to 80 GPa, more preferably at most 75 GPa. When the strength is desired to be particularly high, E is more preferably at most 60 GPa.

The breaking of the PDP front substrate is considered to happen in the above-mentioned manner such that the barrier ribs formed on the rear substrate and the electrode-covering glass layer crash to each other and become damaged. Moreover, it is considered that when E of the electrode-covering glass layer at that time, is smaller, the impact by the crashing is more absorbed, and damage will rarely be formed. Since E of the glass of the present invention is, for example, at most 80 GPa, it is considered that the damage is rarely formed by crashing and hardly reaches breaking.

The strength of glass material constituting an electrode-covering layer, is governed by Kc, etc., but in a case of the electrode-covering glass layer-coated glass substrate, the strength of the electrode-covering layer becomes high or low depending on the stress formed by the difference between α of the glass substrate i.e. $α_0$ and α of the electrode-covering glass layer, in the step of cooling to room temperature after the step of firing to form the electrode-covering glass layer. That is, when α of the electrode-covering glass layer is smaller than $α_0$, the compressional stress is exerted on the surface of the electrode-covering glass layer, whereby the strength of the electrode-covering glass layer becomes high.

When α is greater than $α_0$, the tensile stress is exerted, whereby the strength of the electrode-covering glass layer becomes low.

When $α_0$ is from $80×10^{-7}$ to $86×10^{-7}/°$ C., α of the glass of the present invention is preferably from $73×10^{-7}$ to $90×10^{-7}/°$ C. If α of the glass of the present invention exceeds $90×10^{-7}/°$ C., when the glass is used for covering electrodes on the glass substrate, the strength of the electrode-covering glass layer-coated substrate, may decrease. α of the glass of the present invention is more preferably at most $85×10^{-7}/°$ C. Further, if α of the glass of the present invention is less than $73×10^{-7}/°$ C., the stress to be formed by the difference with α of the glass substrate i.e. $α_0$, becomes too large, whereby the substrate may be deformed or broken.

Typically, the glass of the present invention essentially comprises, as represented by mass % based on the following oxides, from 30 to 50% of $B_2O_3$, from 21 to 25% of $SiO_2$, from 10 to 35% of ZnO, from 7 to 14% of $Li_2O+Na_2O+K_2O$, from 0 to 10% of $Al_2O_3$, and from 0 to 10% of $ZrO_2$, and it contains $K_2O$ and at least one of $Li_2O$ and $Na_2O$. When the glass of the present invention contains at least one component selected from the group consisting of MgO, CaO, SrO and BaO, the total of their contents is at most 5%, and with respect to the above l, n and k, l is at most 0.025, and l+n+k is from 0.07 to 0.13.

With reference to such a typical embodiment, components, etc. of the glass of the present invention will be as follows. Further, a molar fraction is one having the content by mol % divided by 100.

$B_2O_3$ is a component to stabilize the glass or to lower Ts, and is essential. Further, it has an effect to lower ∈. If $B_2O_3$ is less than 30%, vitrification tends to be difficult. It is preferably at least 31%. For example, if a ZnO content is less than 20%, $B_2O_3$ is preferably at least 35%. If $B_2O_3$ exceeds 50%, phase separation tends to take place, or chemical durability may decrease.

$SiO_2$ is a component to form the matrix of the glass, and is essential. If $SiO_2$ is less than 21%, Kc tends to be small and the strength tends to decrease. $SiO_2$ is typically at least 21.5%. If it exceeds 25%, Ts tends to be high. It is typically at most 24%.

ZnO is a component to lower Ts and α, and is essential. If ZnO is less than 10%, α may be large. It is preferably at least 12%. If ZnO exceeds 35%, the glass tends to be unstable. Further, Kc tends to be small. ZnO is preferably at most 32%. When the stability of the glass is desired to be high, ZnO is preferably less than 20%.

$Li_2O$, $Na_2O$ and $K_2O$ are, respectively, components to facilitate vitrification or to lower Ts, and also components to increase α and to lower Kc.

At least one of $Li_2O$ and $Na_2O$ must be contained. If neither $Li_2O$ nor $Na_2O$ is contained, Ts will be high, or warpage will be large.

When $Li_2O$ is contained, its molar fraction l is at most 0.025. If it exceeds 0.025, there will be a large convex warpage on the side where the glass layer is not formed. It is considered that in alkali metal ion exchange between the electrode-covering glass layer and the glass substrate, Li ions having small radius will penetrate into the surface of the glass substrate, whereby the surface of the glass substrate in contact with the electrode-covering glass layer will shrink. l/(l+n+k) is preferably at most 0.2.

Typically, $Li_2O$ is not contained.

$Na_2O$ is preferably contained in a range of at most 7%. If it exceeds 7%, warpage may be large, or Kc may decrease. It is more preferably at most 6%.

$K_2O$ is a component to decrease warpage, and is essential. K ions have large ionic radius, and are hard to transfer as compared with other alkali metal ions, so that it is considered that when $K_2O$ is contained, alkali metal ion exchange is made to be hard to proceed. $K_2O$ is preferably contained at least 2%, more preferably at least 5%.

However, if only $K_2O$ is contained as an alkali metal component, when a glass layer is formed on one side of a glass substrate, a convex warpage will be formed on the side where the glass layer is formed. It is considered that K ions having large ion radius penetrate into the surface of the glass substrate, whereby the surface of the glass substrate in contact with the electrode-covering glass layer may expand.

When the total content $R_2O$ of $Li_2O$, $Na_2O$ and $K_2O$ is less than 7%, and l+n+k is less than 0.07, Ts will be high. Typically, $R_2O$ is at least 9%, and l+n+k is at least 0.09. If $R_2O$ exceeds 14%, and l+n+k exceeds 0.13, α will be large. Further, Kc will decrease. Preferably $R_2O$ is at most 13%, and l+n+k is at most 0.12.

$Al_2O_3$ is not essential, but it may be contained in a range of at most 10% to increase the glass stability or Kc, etc., and typically, it is contained at least 1%. If it exceeds 10%, when silver electrodes are covered, a phenomenon tends to take place, such that silver diffuses in the electrode-covering glass and develops a color is (silver coloration). It is preferably at most 7%. When it is desired to prevent silver coloration, $Al_2O_3$ is preferably less than 1%, more preferably not contained.

Further, the molar fraction of $Al_2O_3$ is typically less than 0.04.

The total content of $B_2O_3$, $SiO_2$ and $Al_2O_3$ is preferably at least 55%. If it is less than 55%, Kc tends to be small. The total content is more preferably at least 60%.

$ZrO_2$ is not essential, but it may be contained in a range of at most 10% to increase the chemical durability of the glass, to increase the strength, etc.

The typical embodiment of the glass of the present invention essentially comprises the above components, and it is possible to further contain other components within a range not to impair the object of the present invention. In such a case, the total content of components other than the above components, is preferably at most 12%, more preferably at most 10%, typically at most 5%. Typical representatives of such components are as follows.

MgO, CaO, SrO and BaO, have an effect of stabilizing the glass or lowering α. For such a purpose, it is possible to incorporate at least one member of the four components in a range of at most 5% in total of their contents. If it exceeds 5%, Kc tends to be small. It is more preferably at most 3%. Further, the total of the respective molar fractions of the above four components is typically less than 0.05.

When BaO is contained, its content is preferably at most 1%. If it exceeds 1%, Kc tends to decrease. If Kc is desired to be larger, it is preferred not to contain BaO.

When it is desired to suppress a phenomenon such that the binder is not removed sufficiently at the time of firing, whereby carbon remains in the glass after firing, and the glass is colored, three components such as CuO, $CeO_2$ and CoO may be incorporated up to 3% in total of their contents. If the total content exceeds 3%, the coloration of the glass will conversely become remarkable. The total content is typically at most 1.5%. When either one of such three components is contained, it is typical to contain CuO in a range of at most 1.5%.

For improvement of sintering property, etc., $Bi_2O_3$ may be contained up to 5%, but from a viewpoint such that $Bi_2O_3$ has a resource problem, etc., it is preferred not to contain $Bi_2O_3$.

A component such as $TiO_2$, $ZrO_2$, $SnO_2$ or $MnO_2$ is exemplified as a component which may be used for a purpose of adjusting α, Ts, chemical durability, glass stability, transmittance of a glass-covering layer, etc., and of suppressing the silver coloration phenomenon.

Further, the glass of the present invention does not contain PbO.

The glass 1 of the present invention is preferred when it is particularly desired to increase the strength of the electrode-formed glass substrate. Now, the components, etc. of the glass 1 of the present invention will be described.

$B_2O_3$ is a component to stabilize the glass, to increase Kc of to lower E, and is essential. If $B_2O_3$ is less than 43%, E tends to be large, and the strength tends to decrease. It is preferably at least 44%. If $B_2O_3$ exceeds 50%, phase separation tends to take place, or chemical durability may decrease. It is typically at most 49%.

$SiO_2$ is a component to form the matrix of the glass, and is essential. If $SiO_2$ is less than 21%, Kc tends to be small, or warpage tends to be large. It is considered that the matrix component of the glass decreases, and alkali metal ion exchange tends to take place between the electrode-covering glass and the glass substrate. If it exceeds 25%, Ts tends to be high.

The total content of $B_2O_3$ and $SiO_2$ is preferably at least 68%, more preferably at least 70%.

ZnO is a component to decrease Ts and to lower α, and is essential. It is also a component to increase E. If ZnO is less than 10%, α tends to be large. It is preferably at least 11%. If ZnO exceeds 23%, the glass tends to be unstable. Further, ∈ tends to be too large. When ∈ is desired to be low, ZnO is preferably at most 18%, more preferably less than 15%.

$Li_2O$, $Na_2O$ and $K_2O$ are, respectively, components to facilitate vitrification or to decrease Ts, and also components to increase α, to decrease Kc and to increase E.

Among them, $K_2O$ is a component to decrease warpage, and is essential.

K ions have large ionic radius, and are hard to transfer as compared with other alkali metal ions, so that it is considered that when $K_2O$ is contained, alkali metal ion exchange is made to be hard to proceed. $K_2O$ is preferably contained at least 5%.

However, if only $K_2O$ is contained as an alkali metal component, when a glass layer is formed on one side of a glass substrate, a convex warpage will be formed on the side where the glass layer is formed. It is considered that K ions having large ion radius penetrate into the surface of the glass substrate, whereby the surface of the glass substrate in contact with the electrode-covering glass layer may expand. Further, $K_2O$ is a component to increase ∈ and to increase α, whereby its content is preferably at most 9%.

$Na_2O$ has a high effect to lower Ts, and is essential. If it is less than 2%, such an effect will be insufficient. If it exceeds 5%, α will be large.

$Li_2O$ may be contained up to 0.5% when α is desired to be decreased. However, $Li_2O$ is also a component to increase E remarkably, and from such a viewpoint, it is usually preferably not contained. When $Li_2O$ is contained, its molar fraction l is at most 0.025. If it exceeds 0.025, there will be a large convex warpage on the side where the glass layer is not formed. It is considered that in alkali metal ion exchange between the electrode-covering glass layer and the glass substrate, Li ions having small radius will penetrate into the surface of the glass substrate, whereby the surface of the glass substrate in contact with the electrode-covering glass layer will shrink. $l/(l+n+k)$ is preferably at most 0.2.

When the total content $R_2O$ of $Li_2O$, $Na_2O$ and $K_2O$ is less than 7%, and l+n+k is less than 0.07, Ts will be high. Typically, $R_2O$ is at least 8%, and l+n+k is at least 0.08. If $R_2O$ exceeds 12%, and l+n+k exceeds 0.11, α will be large or Kc will be small. Preferably $R_2O$ is at most 10%, and l+n+k is at most 0.105.

$Al_2O_3$ may be contained to increase the glass stability or Kc, etc. If it exceeds 5%, when silver electrodes are covered, a phenomenon tends to take place, such that silver diffuses in the electrode-covering glass and develops a color (silver coloration). It is preferably at most 3%. When it is desired to prevent silver coloration, $Al_2O_3$ is preferably less than 1%, more preferably not contained.

Further, the molar fraction of $Al_2O_3$ is typically less than 0.04.

$ZrO_2$ is not essential, but it may be contained in a range of at most 10% to increase the chemical durability of the glass, to increase the strength, etc. If it exceeds 10%, crystallization tends to easily take place, or Ts tends to be high. Further, ∈ tends to be too large. It is preferably at most 7%, more preferably at most 5%. When ∈ is desired to be low, it is preferably at most 2%.

The glass 1 of the present invention essentially comprises the above components, and it is possible to further contain other components within a range where the object of the present invention is not impaired. In such a case, the total content of components other than the above components, is preferably at most 5%, more preferably at most 4%, typically at most 3%. Typical representatives of such components are as follows.

When it is desired to suppress a phenomenon such that the binder is not removed sufficiently at the time of firing, whereby carbon remains in the glass after firing, and the glass is colored, three components such as CuO, $CeO_2$ and CoO may be incorporated up to 3% in total of their contents. If the above total exceeds 3%, coloration of glass conversely becomes remarkable. It is typically at most 1.5%. When any one of such three components is incorporated, typically, CuO is contained in a range of at most 1.5%.

A component such as $TiO_2$, $ZrO_2$, $SnO_2$ or $MnO_2$ is exemplified as a component which may be used for a purpose of adjusting α, Ts, chemical durability, glass stability, transmittance of a glass-covering layer, etc., and of suppressing the silver coloration phenomenon. For the above purposes, typically, the above $ZrO_2$ is contained in a range of at most 3%.

Further, the glass 1 of the present invention does not contain PbO.

The glass ceramic composition of the present invention is typically used for covering address electrodes of a PDP rear substrate.

The components of the glass ceramic composition of the present invention and their contents will be described.

A powder of a lead-free glass is the main component of the glass ceramic composition for the electrode-covering layer, and is essential. The typical content is, as represented by mass %, from 90 to 99.9%.

Such a lead-free glass is the glass of the present invention, and its components, as represented by mass %, will be described.

$B_2O_3$ is a component to stabilize the glass or to lower Ts or ∈, and is essential. If $B_2O_3$ is less than 30%, vitrification tends to be difficult. It is preferably at least 32%, more preferably at least 35%. If $B_2O_3$ exceeds 50%, phase separation tends to take place, or chemical durability tends to decrease. It is preferably at most 47%, typically at most 45%.

SiO$_2$ is a component to form the matrix of the glass and to lower ∈, and is essential. If SiO$_2$ is less than 21%, ∈ tends to be large. If it exceeds 25%, Ts tends to be high. It is preferably at most 23%.

ZnO is a component to lower Ts and α, and is essential. If it is less than 10%, α tends to be large. It is preferably at least 12%. If it exceeds 23%, the glass tends to be unstable, and ∈ tends to be too large. ZnO is preferably less than 20%. When ∈ is desired to be low, it is preferably less than 15%.

Further, the molar fraction of ZnO is typically less than 0.20.

Li$_2$O, Na$_2$O and K$_2$O are, respectively, components to facilitate vitrification or to lower Ts, and also components to increase α, to lower Kc and to increase ∈.

Among them, at least one of Li$_2$O or Na$_2$O must be contained. If neither Li$_2$O nor Na$_2$O is contained, Ts will be high, or warpage will be large.

When Li$_2$O is contained, its molar fraction l is at most 0.025. If it exceeds 0.025, there will be a large convex warpage on the side where the glass layer is not formed. It is considered that in alkali metal ion exchange between the electrode-covering glass layer and the glass substrate, Li ions having small radius will penetrate into the surface of the glass substrate, whereby the surface of the glass substrate in contact with the electrode-covering glass layer will shrink. l/(l+n+k) is preferably at most 0.2.

Na$_2$O is preferably contained in a range of at most 7%. If it exceeds 7%, warpage tends to be large, or Kc tends to decrease. It is more preferably at most 6%.

K$_2$O is a component to decrease warpage, and is essential when silver coloration is desired to be suppressed.

K ions have large ionic radius, and are hard to transfer as compared with other alkali metal ions, so that it is considered that when K$_2$O is contained, alkali metal ion exchange is made to be hard to proceed. K$_2$O is preferably contained at least 2%, more preferably at least 5%.

When the total content R$_2$O of Li$_2$O, Na$_2$O and K$_2$O is less than 10%, or l+n+k is less than 0.08, Ts will be high. Preferably, R$_2$O is at least 10%. More preferably, R$_2$O is at least 12%, and l+n+k is at least 0.1. Typically, R$_2$O is at least 15%, and l+n+k is at least 0.12. If R$_2$O exceeds 19%, or l+n+k exceeds 0.17, α will be large, or Kc will decrease. Preferably R$_2$O is at most 17%, and l+n+k is at most 0.15.

Al$_2$O$_3$ is not essential, but it may be contained in a range of at most 10% to increase the glass stability or Kc, etc. If it exceeds 10%, silver coloration tends to take place. It is preferably at most 8%. When it is desired to prevent the silver coloration, Al$_2$O$_3$ is preferably less than 3%, more preferably not contained.

ZrO$_2$ is not essential, but it may be contained in a range of at most 5% to increase the chemical durability of the glass, to increase the strength, etc. If it exceeds 5%, Ts tends to be high. Further, ∈ tends to be large. When ∈ is desired to be low, it is preferably at most 2%.

The typical embodiment of the lead-free glass to be used for the glass ceramic composition of the present invention, essentially comprises the above components, and it is possible to further contain other components within a range where the object of the present invention is not impaired. In such a case, the total content of components other than the above components, is preferably at most 12%, more preferably at most 10%, typically at most 5%. Typical representatives of such components are as follows.

MgO, CaO, SrO and BaO, respectively, are not essential, but they may sometimes have an effect of stabilizing the glass or reducing α. For such a purpose, it is possible to incorporate at least one member of the four components in a range of at most 5% in total of their contents. If it exceeds 5%, Kc tends to be small. Further, ∈ tends to be large. It is more preferably at most 3%. Further, the total of the respective molar fractions of the above four components is typically less than 0.05.

When BaO is contained, its content is preferably at most 1%. If it exceeds 1%, Kc tends to decrease. If Kc is desired to be larger, it is preferred not to contain BaO.

When it is desired to suppress a phenomenon such that the binder is not removed sufficiently at the time of firing, whereby carbon remains in the glass after firing, and the glass is colored, three components such as CuO, CeO$_2$ and CoO may be incorporated up to 3% in total of their contents. If the total content exceeds 3%, the coloration of the glass will conversely become remarkable. The total content is typically at most 1.5%.

When any one of such three components is contained, it is typical to contain CuO in a range of at most 1.5%.

For improvement of sintering property, etc., Bi$_2$O$_3$ may be contained up to 5%, but from a viewpoint such that Bi$_2$O$_3$ has a resource problem, etc., it is preferred not to contain Bi$_2$O$_3$.

A component such as TiO$_2$, ZrO$_2$, SnO$_2$ or MnO$_2$ is exemplified as a component which may be used for a purpose of adjusting α, Ts, chemical durability, glass stability, transmittance of a glass-covering layer, etc., and of suppressing the silver coloration phenomenon. For the above purposes, it is possible to incorporate the above ZrO$_2$.

Further, the lead-free glass is preferred to have Ts of at most 600° C. and ∈ of at most 7.0.

A powder of titanium oxide is a component to increase the reflectance of the electrode-covering layer, and the typical content is, as represented by mass %, from 0.1 to 10%.

H/H$_0$ of a glass layer-coated glass substrate wherein a glass layer made of the glass of the present invention is formed on one surface of the glass substrate, is preferably at least 1.5, more preferably at least 1.7.

Further, the strength index S of such a glass layer-coated glass substrate is at least 1.5, more preferably at least 1.7.

As the glass substrate of the present invention, a PDP front substrate is typical, and in such a case, electrodes to be covered with the glass of the present invention are transparent electrodes of e.g. ITO, and bus electrodes such as silver electrodes or Cr—Cu—Cr electrodes, which are formed on parts of the surface of the transparent electrodes.

The process for producing the glass substrate of the present invention is suitable as a process for producing the PDP front substrate or the PDP rear substrate, and in such a case, it is possible to carry out the process in the same manner as in a known production process, except for using the glass of the present invention as a glass for covering the electrodes of the front substrate or the rear substrate.

The PDP produced by the present invention may be a known PDP except that the glass of the present invention is used as a glass for covering the front substrate electrodes or rear substrate electrodes such as address electrodes, and the production may be carried out in the same manner as in a known production process except that the glass of the present invention is used as a glass for covering the front substrate electrodes or the rear substrate electrodes.

Examples

Starting materials were formulated and mixed so that the composition would be as shown by mass % in lines from B$_2$O$_3$ to CuO of Examples 1 to 8 and 12 in Table 1. Each mixture was heated to 1,250° C. and melted for 60 minutes by means of a platinum crucible. Examples 1 to 8 represent Examples of the present invention, and Example 12 represents a Comparative Example. Further, in Table 2, each glass component is shown by mol %.

The obtained molten glass was partly poured into stainless-steel rollers to be processed into flakes. The glass flakes obtained were subjected to dry grinding for 16 hours by an alumina ball mill, followed by airflow classification, to prepare a glass powder having a $D_{50}$ of from 2 to 4 μm.

Further, the rest of the above molten glass was poured into a stainless-steel frame and annealed. The annealed glass was partly processed into a cylindrical is shape with a length of 20 mm and a diameter of 5 mm, and using a quartz glass as a standard sample, α of such a glass was measured under a load of 10 g by using a horizontal differential detection system thermal dilatometer, TD 5010SA-N, manufactured by Bruker AXS. The results are shown in Tables (unit: $10^{-7}/°$ C.).

Further, circular electrodes having a diameter of 38 mm were formed on both sides of a plate-shape sample having a thickness of about 3 mm produced by using a part of the annealed glass, and the relative dielectric constant ∈ at 1 MHz was measured by using LCR meter 4192 A, manufactured by Yokokawa Hewlett-Packard Company. The results are shown in Tables. Further, "-" in Tables mean that measurements were not carried out.

Further, using such a glass powder as a sample, Ts (unit: ° C.) was measured by means of a differential thermal analyzer (DTA).

The rest of the annealed glass was processed into a plate-shape having a thickness of 10 mm, and the elastic modulus E (unit: GPa) was measured in accordance with JIS R 1602-1995 "Testing methods for elastic modulus of fine ceramics 5.3 Ultrasonic pulse method".

Further, one side of the above glass which was processed into a plate-shape, was mirror-polished, and in order to remove the remaining stress, the glass was held at a temperature of from 500° C. to 520° C. for one hour and then annealed. By using such a specimen, Kc (unit: $MPa·m^{1/2}$) was measured by the above method.

Further, 100 g of the above glass powder was kneaded with 25 g of an organic vehicle having 10 mass % of ethyl cellulose dissolved in α-terpineol or the like, to prepare a glass paste. The paste was uniformly screen-printed on the above conventional glass substrate having a size of 100 mm×100 mm and a thickness of 2.8 mm, and dried at 120° C. for 10 minutes. Then, such a glass substrate was heated at a temperature-raising rate of 10° C. per minute up to 570° C., and maintained at the temperature for 30 minutes to carry out firing, whereby a glass layer was formed on the glass substrate.

By using values of E, Kc and α, which were obtained in the above manner, and using a value of $α_0$ of the glass substrate, the above strength index S was calculated.

Further, H was measured with respect to such a glass layer-coated glass substrate, and by using separately measured $H_0$, $H/H_0$ was calculated.

The results of the above measurements or calculation are shown in Tables. "-" in Tables means that measurements were not carried out.

Examples 9 to 11 in Table 1 are Examples of the present invention, but melting as mentioned above was not carried out. S and the estimated values of Ts, α, E and Kc obtained by calculation from the compositions of such Examples, are also shown in Table 1.

TABLE 1

| | Ex. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $B_2O_3$ | 32.0 | 31.9 | 40.2 | 40.3 | 43.6 | 47.8 | 43.8 | 47.0 | 41.2 | 41.1 | 40.7 | 35.5 |
| $SiO_2$ | 22.6 | 22.5 | 21.7 | 21.8 | 21.4 | 24.8 | 23.5 | 24.3 | 22.9 | 23.7 | 24.8 | 11.5 |
| ZnO | 30.6 | 30.6 | 17.6 | 17.7 | 13.9 | 16.8 | 17.1 | 16.5 | 20.6 | 19.5 | 22.0 | 40.0 |
| $Na_2O$ | 4.7 | 4.7 | 4.5 | 4.5 | 5.3 | 4.2 | 4.3 | 3.4 | 4.4 | 3.5 | 4.4 | 1.0 |
| $K_2O$ | 7.2 | 7.2 | 6.8 | 6.8 | 8.0 | 5.2 | 6.6 | 7.6 | 6.6 | 8.0 | 8.1 | 9.0 |
| $Al_2O_3$ | 2.8 | 1.4 | 4.4 | 5.9 | 7.3 | 0 | 0 | 0 | 4.3 | 4.3 | 0 | 1.0 |
| $ZrO_2$ | 0 | 1.7 | 3.6 | 1.8 | 0 | 0 | 3.5 | 0 | 0 | 0 | 0 | 0 |
| CaO | 0 | 0 | 0 | 0 | 0 | 0 | 0 | 0 | 0 | 0 | 0 | 2.0 |
| CuO | 0 | 0 | 1.2 | 1.2 | 0.6 | 1.1 | 1.1 | 1.1 | 0 | 0 | 0 | 0 |
| CoO | 0 | 0 | 0.1 | 0.1 | 0 | 0.1 | 0.1 | 0.1 | 0 | 0 | 0 | 0 |
| Ts | 602 | 601 | 599 | 596 | 587 | 596 | 598 | 593 | 609 | 612 | 596 | 596 |
| ∈ | 7.4 | 7.4 | 6.6 | 6.6 | 6.5 | 5.9 | 6.6 | 6.0 | 6.4 | 6.4 | 6.6 | 7.9 |
| α | 82 | 80 | 74 | 74 | 81 | 65 | 71 | 71 | 76 | 76 | 79 | 73 |
| E | 65 | 67 | — | — | 55 | 55 | 56 | 55 | 58 | 57 | 62 | 67 |
| Kc | 0.80 | 0.74 | — | — | 0.82 | 0.83 | 0.78 | 0.81 | 0.81 | 0.82 | 0.76 | 0.65 |
| S | 1.8 | 1.8 | — | — | 2.3 | 3.7 | 2.8 | 3.0 | 2.5 | 2.6 | 1.9 | 1.6 |
| $H/H_0$ | 1.6 | 1.8 | 2.2 | 2.1 | — | 3.9 | 2.7 | 3.1 | — | — | — | 1.3 |

TABLE 2

| | Ex. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $B_2O_3$ | 33.0 | 33.0 | 41.6 | 41.6 | 44.7 | 47.6 | 44.5 | 47.1 | 42.0 | 42.0 | 41.0 | 37.8 |
| $SiO_2$ | 27.0 | 27.0 | 26.0 | 26.1 | 25.4 | 28.6 | 27.7 | 28.2 | 27.0 | 28.0 | 29.0 | 14.2 |
| ZnO | 27.0 | 27.0 | 15.6 | 15.6 | 12.2 | 14.3 | 14.9 | 14.2 | 18.0 | 17.0 | 19.0 | 36.4 |
| $Na_2O$ | 5.5 | 5.5 | 5.2 | 5.2 | 6.1 | 4.7 | 4.9 | 3.8 | 5.0 | 4.0 | 5.0 | 1.2 |
| $K_2O$ | 5.5 | 5.5 | 5.2 | 5.2 | 6.1 | 3.8 | 5.0 | 5.6 | 5.0 | 6.0 | 6.0 | 7.1 |
| $Al_2O_3$ | 2.0 | 1.0 | 3.1 | 4.2 | 5.1 | 0 | 0 | 0 | 3.0 | 3.0 | 0 | 0.7 |
| $ZrO_2$ | 0 | 1.0 | 2.1 | 1.1 | 0 | 0 | 2.0 | 0 | 0 | 0 | 0 | 0 |
| CaO | 0 | 0 | 0 | 0 | 0 | 0 | 0 | 0 | 0 | 0 | 0 | 2.6 |
| CuO | 0 | 0 | 1.1 | 1.1 | 0.5 | 1.0 | 1.0 | 1.0 | 0 | 0 | 0 | 0 |
| CoO | 0 | 0 | 0.1 | 0.1 | 0 | 0.1 | 0.1 | 0.1 | 0 | 0 | 0 | 0 |

A powder of the glass in the above Example 5 or 12, a $SiO_2$ powder (amorphous silica, SO—C2, manufactured by Admatechs) and a $TiO_2$ powder (TIPAQUE A-220, manufactured by ISHIHARA SANGYO KAISYA, LTD) were mixed so that the composition would be as shown by mass % in lines in Table 3, whereby a glass ceramic composition was prepared. Example A represents a glass ceramic composition of the present invention, and Example B represents Comparative Example. Further, in parentheses, the content of each powder is shown by volume %.

100 g of each glass ceramic composition was kneaded with 25 g of an organic vehicle having 10 mass % of ethyl cellulose dissolved in α-terpineol or the like, to prepare a glass paste. The paste was uniformly screen-printed on the conventional glass substrate having a size of 100 mm×100 mm and a thickness of 2.8 mm, to have a film thickness of 20 μm after firing, and dried at 120° C. for 10 minutes. Then, such a glass substrate was heated at a temperature-raising rate of 10° C. per minute up to 570° C., and maintained at the temperature for 30 minutes to carry out firing.

With respect to the glass ceramic layer-coated glass substrate obtained in such a manner, a total luminous reflectance (unit: %) at 560 nm was measured by using a spectrophotometer, in accordance with JIS K 7375. The results are shown in Table 3. Further, when the substrate is used for a PD rear substrate, the total luminous reflectance is preferably at least 45%.

Further, H was measured, and by using separately measured $H_0$, $H/H_0$ was calculated. The results are shown in Table 3.

Further, measurements of dielectric constant were carried out by the following method. That is, on the glass substrate, a gold paste was applied, followed by drying to form a lower electrode, and then, the above glass ceramic paste was uniformly applied to have a film thickness of 20 μm after firing, followed by drying at 120° C. for 10 minutes. Such a glass substrate was heated at a temperature-raising rate of 10° C. per minute up to 570° C., and maintained at the temperature for 30 minutes to carry out firing. On the obtained film subjected to firing, the gold paste was screen-printed, followed by drying to form an upper electrode. A dielectric constant of the fired film was measured by using LCR meter. The results are shown in Table 3. Further, when the glass ceramic composition of the present invention is used as an electrode-covering layer of the PDP rear substrate, its dielectric constant is preferably at most 8.5.

TABLE 3

|  | Ex A | Ex B |
|---|---|---|
| Type of glass | 5 | 12 |
| Powder of glass | 90.0 (91) | 95.5 (95) |
| $SiO_2$ powder | 5.3 (6) | 1.2 (2) |
| $TiO_2$ powder | 4.7 (3) | 3.2 (3) |
| Dielectric constant | 6.8 | 8.9 |
| $H/H_0$ | 2.2 | 1.1 |
| Reflectance | 50 | 50 |

The present invention is useful for PDP, a PDP front substrate, a PDP rear substrate, an electrode-covering glass for a PDP front substrate and an electrode-covering glass for a PDP rear substrate.

The entire disclosures of Japanese Patent Application No. 2007-184781 filed on Jul. 13, 2007 and Japanese Patent Application No. 2008-127195 filed on May 14, 2008 including specifications, claims, drawings and summaries are incorporated herein by reference in their entireties.

What is claimed is:

1. A glass ceramic composition, comprising
a fired mixture of a powder of a lead-free glass and a powder of titanium oxide, wherein
the lead-free glass comprises, as represented by mass % based on the following oxides and relative to the total mass of the lead-free glass,
from 30 to 50% of $B_2O_3$,
from 21 to 25% of $SiO_2$,
from 10 to 23% of ZnO,
from 9 to 19% in total of $K_2O$ and at least one of $Li_2O$ and $Na_2O$,
from 0 to 10% of $Al_2O_3$, and
from 0 to 5% of $ZrO_2$ and optionally at least one component selected from the group consisting of MgO, CaO, SrO and BaO, the total content thereof is at most 5%, with the molar fractions of $Li_2O$, $Na_2O$ and $K_2O$ represented by l, n and k, respectively, l is at most 0.025, and l+n+k is from 0.08 to 0.17,
the powder of lead-free glass is present in the fired mixture in an amount of from 90 to 99.9 mass %, relative to the total mass of the fired mixture,
the powder of titanium oxide is present in the fired mixture in an amount of from 0.1 to 10 mass %, relative to the total mass of the fired mixture, and
the lead-free glass has a calculated strength index value of at least 1.7.

2. The glass ceramic composition according to claim 1, which is the form of particles having an average particle diameter of at least 0.5 μm.

3. The glass ceramic composition according to claim 1, which is the form of particles having an average particle diameter of from 0.5 to 20 μm.

4. The glass ceramic composition according to claim 1, having a Ts of from 500 to 630° C.

5. The glass ceramic composition according to claim 1, which comprises, as represented by mass % based on the following oxides and relative to the total mass of the lead-free glass,
from 35 to 50% of $B_2O_3$,
from 21.5 to 24% of $SiO_2$, and
from 12 to less than 20% of ZnO.

6. The glass ceramic composition according to claim 1, which comprises, as represented by mass % based on the following oxides and relative to the total mass of the lead-free glass,
from 35 to 45% of $B_2O_3$,
from 21.5 to 23% of $SiO_2$, and
from 12 to less than 15% of ZnO.

7. The glass ceramic composition according to claim 1, wherein the total content of $B_2O_3$, $SiO_2$, and $Al_2O_3$ is at least 55%, relative to the total mass of the lead-free glass.

8. The glass ceramic composition according to claim 1, which comprises from 9 to 19 mass % in total of $K_2O$ and $Li_2O$, relative to the total mass of the lead-free glass.

9. The glass ceramic composition according to claim 1, wherein the total content of $B_2O_3$ and $SiO_2$ is at least 68 mass %, relative to the total mass of the lead-free glass.

10. The glass ceramic composition according to claim 1, wherein $Na_2O$ is present with $K_2O$ and is present in an amount of from 2 to 5 mass %, relative to the total mass of the lead-free glass.

11. The glass ceramic composition according to claim 1, wherein the lead free glass comprises at most 10 mass % in total of $K_2O$ and at least one of $Li_2O$ and $Na_2O$, relative to the total mass of the lead-free glass, and l+n+k is from 0.08 to 0.105.

12. The glass ceramic composition according to claim 1, wherein $Al_2O_3$ is present in the lead-free glass in an amount of from 1.4 to 8 mass %, relative to the total mass of the lead-free glass.

13. The glass ceramic composition according to claim 1, wherein the lead-free glass further comprises CuO in an amount of at most 1.5 mass %, relative to the total mass of the lead-free glass, or the lead-free glass further comprises CuO, $CeO_2$, and CoO and the total content thereof is at most 3 mass %, relative to the total mass of the lead-free glass.

14. A process, comprising forming electrodes on a glass substrate and covering the electrodes with glass, wherein the electrodes are covered with a lead-free glass according to claim 1.

15. The process according to claim 14, wherein the lead-free glass has a $B_2O_3$ content of at least 43%, a ZnO content of at most 23%, an $Li_2O$ content of from 0 to 0.5%, an $Na_2O$ content of from 2 to 5%, a $K_2O$ content of from 4 to 10%, a total content of $Li_2O$, $Na_2O$ and $K_2O$ of at most 12%, and an $Al_2O_3$ content of from 0 to 5%, and l+n+k is at most 0.11.

16. The process according to claim 14, wherein the lead-free glass has a total content of $B_2O_3$ and $SiO_2$ of at least 68%.

17. The process according to claim 14, wherein the lead-free glass does not contain $Li_2O$.

18. A process comprising forming electrodes on a glass substrate, firing the glass ceramic composition as defined in claim 1 to form fired glass, and covering the electrodes with the fired glass.

* * * * *